US012570223B2

(12) United States Patent
Mathes

(10) Patent No.: US 12,570,223 B2
(45) Date of Patent: Mar. 10, 2026

(54) INSULATING WALL FOR A MOTOR VEHICLE, AND MOTOR VEHICLE HAVING AN INSULATING WALL

(71) Applicant: Bayerische Motoren Werke Aktiengesellschaft, Munich (DE)

(72) Inventor: Hans Georg Mathes, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 304 days.

(21) Appl. No.: 18/039,348

(22) PCT Filed: Nov. 8, 2021

(86) PCT No.: PCT/EP2021/080871
§ 371 (c)(1),
(2) Date: May 30, 2023

(87) PCT Pub. No.: WO2022/117281
PCT Pub. Date: Jun. 9, 2022

(65) Prior Publication Data
US 2024/0051477 A1 Feb. 15, 2024

(30) Foreign Application Priority Data

Dec. 4, 2020 (DE) ..................... 10 2020 132 333.6

(51) Int. Cl.
B60R 13/08 (2006.01)
(52) U.S. Cl.
CPC ................................. B60R 13/0838 (2013.01)
(58) Field of Classification Search
CPC ................ B60R 13/0838; B60R 13/08; B60R 2013/0807; B60R 13/0815; B60R 13/083

USPC ..................... 296/39.3; 180/69.22; 123/198 E
See application file for complete search history.

(56) References Cited

U.S. PATENT DOCUMENTS

| | | | |
|---|---|---|---|
| 5,699,601 A | 12/1997 | Gilliam et al. | |
| 8,302,718 B2 * | 11/2012 | Tottori | B62D 25/12 180/69.24 |
| 8,573,672 B2 * | 11/2013 | Schiller | B60R 13/0869 296/39.3 |

(Continued)

FOREIGN PATENT DOCUMENTS

| | | |
|---|---|---|
| CN | 104097583 A | 10/2014 |
| DE | 696 19 446 T2 | 7/2002 |

(Continued)

OTHER PUBLICATIONS

International Search Report (PCT/ISA/210) issued in PCT Application No. PCT/EP2021/080871 dated Jan. 7, 2022 with English translation (4 pages).

(Continued)

*Primary Examiner* — Roger L Pang
(74) *Attorney, Agent, or Firm* — Crowell & Moring LLP

(57) ABSTRACT

An insulating wall for a motor vehicle is designed to separate an engine compartment of the motor vehicle from a passenger compartment of the motor vehicle such that sound is damped and/or thermal insulation is provided. The insulating wall has a first component, which has an insertion groove and has an insulating material, and a second component, which has an insulating material and which is inserted into the insertion groove in an insertion direction and clamped in the insertion groove.

11 Claims, 1 Drawing Sheet

(56) References Cited

U.S. PATENT DOCUMENTS

| | | | |
|---|---|---|---|
| 9,190,044 B2 | 11/2015 | Lee et al. | |
| 2008/0110432 A1 | 5/2008 | Nonogaki | |
| 2014/0299403 A1 | 10/2014 | Lee et al. | |
| 2016/0059799 A1* | 3/2016 | Kim ........................ | B32B 27/14 |
| | | | 156/244.11 |

FOREIGN PATENT DOCUMENTS

| | | |
|---|---|---|
| DE | 10 2006 052 900 A1 | 5/2008 |
| EP | 1 818 475 A2 | 8/2007 |

OTHER PUBLICATIONS

German-language Written Opinion (PCT/ISA/237) issued in PCT Application No. PCT/EP2021/080871 dated Jan. 7, 2022 (4 pages).
German-language Office Action issued in German Application No. 10 2020 132 333.6 dated Sep. 16, 2021 (7 pages).
Office Action issued in Chinese Application No. 202180078879.X dated Jan. 7, 2026 (7 pages).

* cited by examiner

INSULATING WALL FOR A MOTOR VEHICLE, AND MOTOR VEHICLE HAVING AN INSULATING WALL

BACKGROUND AND SUMMARY

The present invention relates to an insulating wall for a motor vehicle and to a motor vehicle having an insulating wall.

A structure of a soundproof cover for an engine compartment which is to be mounted on a body frame at the rear side of the engine compartment in which an engine is mounted is already known from US 2014/0299403 A1. This structure comprises two or more piece members which are detachably coupled to one another and collectively form the soundproof cover in a panel shape. The soundproof cover is to be mounted on the body frame in such a manner that one side surface of the soundproof cover is directed towards the engine and the other side surface of the soundproof cover is directed towards an interior of a vehicle having the engine compartment. Each of the piece members may have a flange portion formed along an edge thereof. This flange portion has a groove into which one end of an adjacent piece member is to be inserted. In a state in which the end of the adjacent piece member is inserted into the groove of the flange portion, it is provided that the piece members are coupled by means of a fastening member by penetrating the flange portion and the end of the adjacent piece member.

The object of the present invention is to create an insulating wall for a motor vehicle and a motor vehicle having an insulating wall which allow particularly good accessibility to an engine compartment of the motor vehicle for a person.

This object is achieved according to the invention by an insulating wall for a motor vehicle and by a motor vehicle having the insulating wall, in accordance with the independent claims. Further possible embodiments of the invention are disclosed in the dependent claims, the description and the figures.

The invention relates to an insulating wall for a motor vehicle which is designed to separate an engine compartment of the motor vehicle from a passenger compartment of the motor vehicle in a soundproof and/or insulated manner. This means that the insulating wall is what is known as a second end wall. The insulating wall is arranged between an actual end wall of the motor vehicle and an engine of the motor vehicle. In particular, the insulating wall may have a plastic component onto which a foam layer and an aluminum foil are applied. The insulating wall is designed for sound insulation, heat insulation and to prevent exhaust gases from entering an air inlet into the passenger compartment. The insulating wall may be arranged extending in the transverse vehicle direction of the motor vehicle between suspension strut receiving means of the motor vehicle in each case. The insulating wall may be further fastened to an upper end wall cross member and to an engine cross member of the motor vehicle.

In order to allow particularly good accessibility of regions of the motor vehicle that are separated by the insulating wall for servicing, it is provided that the insulating wall has a first component and a second component which are designed to be reversibly connected to one another. Both the first component and the second component are formed from an insulating material. The first component therefore provides a first insulating wall region or a first insulating wall portion of the insulating wall, and the second component provides a second insulating wall region or a second insulating wall portion of the insulating wall. The first component has an insertion groove and, for provision of the insulating wall, the second component is inserted into the insertion groove in an insertion direction and clamped therein. Therefore, in order to provide the insulating wall, the first component and the second component are held against one another by frictional engagement. The insertion direction in which the second component is inserted into the insertion groove of the first component extends from an insertion opening of the insertion groove towards a base of the insertion groove. The provision of the insulating wall by inserting the second component into the insertion groove of the first component, and the holding of the components against one another by clamping the components together, allows the insulating wall to be provided in a particularly simple manner and, at the same time, allows the first component to be held against the second component in a particularly secure manner. The insulating wall is therefore provided through a particularly simple joining technique of the first component to the second component, as a result of which the insulating wall can be provided with particularly little effort. Furthermore, in the case of the insulating wall, the first component can be detached from the second component particularly easily, as a result of which the engine compartment is particularly easily accessible for servicing.

In a development of the invention, it is provided that the first component has a recess which interrupts the insertion groove, with which a projection of the second component engages in the insertion direction. In this case, the projection may, in particular, provide a foremost edge of the second component in the insertion direction. Walls of the first component which delimit the recess in each case provide lateral stops for the second component, in particular for the projection of the second component, as a result of which a lateral fixing of the second component relative to the first component takes place through the bearing of the projection against the walls of the first component which laterally delimit the recess. The bearing of the projection of the second component against respective walls of the first component which delimit the recess on opposite sides to one another makes it possible for the first component to be fixed relative to the second component in a first spatial direction running obliquely, in particular perpendicularly, to the insertion direction. With an installation position of the insulating wall, the first spatial direction may be the vehicle transverse direction of the motor vehicle, insofar as the insertion direction of the second component extends into the insertion groove in the vehicle longitudinal direction. The stopping of the projection against the walls of the first component delimiting the recess enables a slipping-out of the second component from the insertion channel in a longitudinal direction of extent of the insertion channel to be at least substantially avoided. As a result, the second component is held in a particularly secure manner against the first component.

In a further embodiment of the invention, it is provided that the insertion groove has a cross section which tapers in the insertion direction, as a result of which the first component is fixed relative to the second component in a spatial direction oriented obliquely, in particular perpendicularly, to the insertion direction, in particular a second spatial direction. In other words, a width of the insertion groove narrows in the insertion direction, in particular in a depth direction of the insertion groove. This depth direction extends from the insertion opening of the insertion groove in the direction of the base of the insertion groove. In particular, the depth direction coincides with the insertion direction. The cross-section of the first component which tapers in the insertion direction enables the second component to be securely applied to the side walls of the first component delimiting the insertion groove, when the second component is inserted in the insertion direction into the insertion groove, as a result of which the second component can form the frictional connection with the side walls of the first component and can thereby be clamped in the insertion groove. The second spatial direction runs obliquely, in particular perpendicularly, to the first spatial direction. In the installation position of the insulating wall, when the insertion direction is oriented in the longitudinal vehicle direction, the second spatial direction runs in the vertical vehicle direction of the motor vehicle. The second component is therefore fixed relative to the first component by applying to the side walls of the first component delimiting the insertion groove in the vertical vehicle direction. The side walls delimit the insertion groove, particularly on sides which are opposite one another, in particular upwardly and downwardly along the vertical vehicle direction, when the insertion direction is oriented in the longitudinal vehicle direction. The tapering cross section of the insertion groove allows the second component to be clamped in the insertion groove of the first component particularly easily.

In a further embodiment of the invention, it is provided that the second component has a rib which extends parallel to a front edge of the second component in the insertion direction and is clamped in the insertion groove. In particular, the second component is clamped in the insertion groove by the rib forming a frictional engagement with at least one side wall of the groove. The rib may, in particular, have a height which rises counter to the insertion direction, as a result of which a secure bearing of the rib against the side wall of the insertion groove can be guaranteed when the second component is inserted into the insertion groove of the first component. In the state of the second component inserted into the first component, the rib can run parallel to the insertion groove along the longitudinal extension of the insertion groove. In this way, it is possible to ensure that the rib is inserted securely in the insertion groove, at least substantially over its entire length, when the second component is in a state inserted in the first component, as a result of which the second component is held particularly securely against the first component.

In a further embodiment of the invention, it is provided that a first side wall member of the first component delimiting the insertion groove on a first side is formed with a first elasticity, and a second side wall member of the first component delimiting the insertion groove on a second side opposite the first side is designed with a second elasticity that is greater compared with the first elasticity. In particular, the first side wall member can provide a first side wall delimiting the insertion groove on a first side, and the second side wall member can provide a second side wall delimiting the insertion groove on a second side opposite the first side. As a result of this, the first side wall member provides a secure and fixed bearing surface for the second component, wherein the second side wall member is designed to yield to the second component in the insertion direction in the insertion groove when the second component is inserted. The yielding of the second side member makes it possible to ensure that the second component can be inserted into the insertion groove up to a predetermined end position in the insertion direction. By specifying the second elasticity of the second side wall member, a clamping effect of the side wall members onto the second component inserted into the insertion groove can be predefined. By adjusting the first elasticity and the second elasticity of the side wall members in each case, a force of the frictional engagement and therefore a holding force of the second component on the first component can be precisely set.

In a further embodiment of the invention, it is provided that the first component and the second component are fixed to one another in the insertion direction via a fixing arranged outside the insertion groove. This means that the first component and the second component are held relative to one another in a predetermined orientation or position, in addition to the clamping connection in the insertion groove by means of the fixing which is provided outside the insertion groove. The first component and the second component are therefore both clamped together and fixed to one another in the insertion direction. In this way, a particularly secure holding of the second component on the first component can be ensured, as a result of which an unwanted detachment of the components from one another can be at least substantially prevented.

In this case, it is provided in a development that in order to provide the fixing, the first component has a latching lug which bears against a stop of the second component. In particular, the latching lug protrudes from the first component obliquely, in particular perpendicularly, to the insertion direction and bears against the stop of the second component in the insertion direction, as a result of which the components are fixed to one another in the insertion direction, and a movement of the second component relative to the first component along the insertion direction is at least substantially prevented. As a result of this, a release of the second component from the insertion groove of the first component while the latching lug bears against the stop can be at least substantially avoided. In order to release the components from one another, the fixing must therefore be released first and the clamping connection of the components can be released subsequently, in order to separate the second component from the first component. A selective separation of the components from one another is therefore possible in a particularly simple manner, wherein an unwanted separation of the components from one another can be prevented in a particularly reliable manner. As an alternative to the embodiment of the first component with the latching lug and of the second component with the stop, the second component can have the latching lug and the first component has the stop on which the latching lug of the second component bears, in order to provide the fixing.

The invention further relates to a motor vehicle having an insulating wall, as has already been described in connection with the insulating wall according to the invention. This insulating wall can be arranged between an end wall of the motor vehicle and an engine of the motor vehicle, by means of which the motor vehicle can be driven, in particular an internal combustion engine. The insulating wall of the motor vehicle that has been described allows particularly good access to the engine compartment, in particular of the engine, for a person, wherein in the case of the insulating wall, the first component and the second component are held against one another particularly easily and securely. Advantages and developments of the insulating wall according to the invention are to be regarded as advantages and developments of the motor vehicle according to the invention, and vice versa.

In a development of the invention, it is provided that the second component is arranged above the first component in the vertical vehicle direction of the motor vehicle. Detaching the second component from the first component makes the engine compartment, or the engine, particularly easily accessible from above. In addition, when the components are arranged oriented above one another in the vertical vehicle direction, they can be separated from one another from above via an open engine hood particularly easily.

In a further embodiment of the invention, it is provided that the second component is inserted into the insertion groove of the first component at least substantially in the vehicle longitudinal direction, as the insertion direction. As a result, the components can be connected to one another particularly easily through a relative displacement of the components in respect of one another along the vehicle longitudinal direction through the provision of a clamping connection, or can be separated from one another by releasing the clamping connection. On the one hand, the insulating wall can therefore be provided particularly easily, and on the other hand, the particularly simple separation of the second component from the first component means that the insulating wall allows particularly good accessibility for a person to a region of the engine compartment that can be separated by means of the insulating wall.

Further features of the invention can be derived from the claims, the figures and the description of the figures. The features and combinations of features referred to above in the description, and the features and combinations of features shown below in the description of the figures and/or in the figures alone can be used not only in the combination indicated in each case, but also in other combinations, or in isolation, without departing from the scope of the invention.

In the figures, members which are identical and functionally identical are provided with the same reference signs.

DETAILED DESCRIPTION OF THE DRAWINGS

Figure 1:
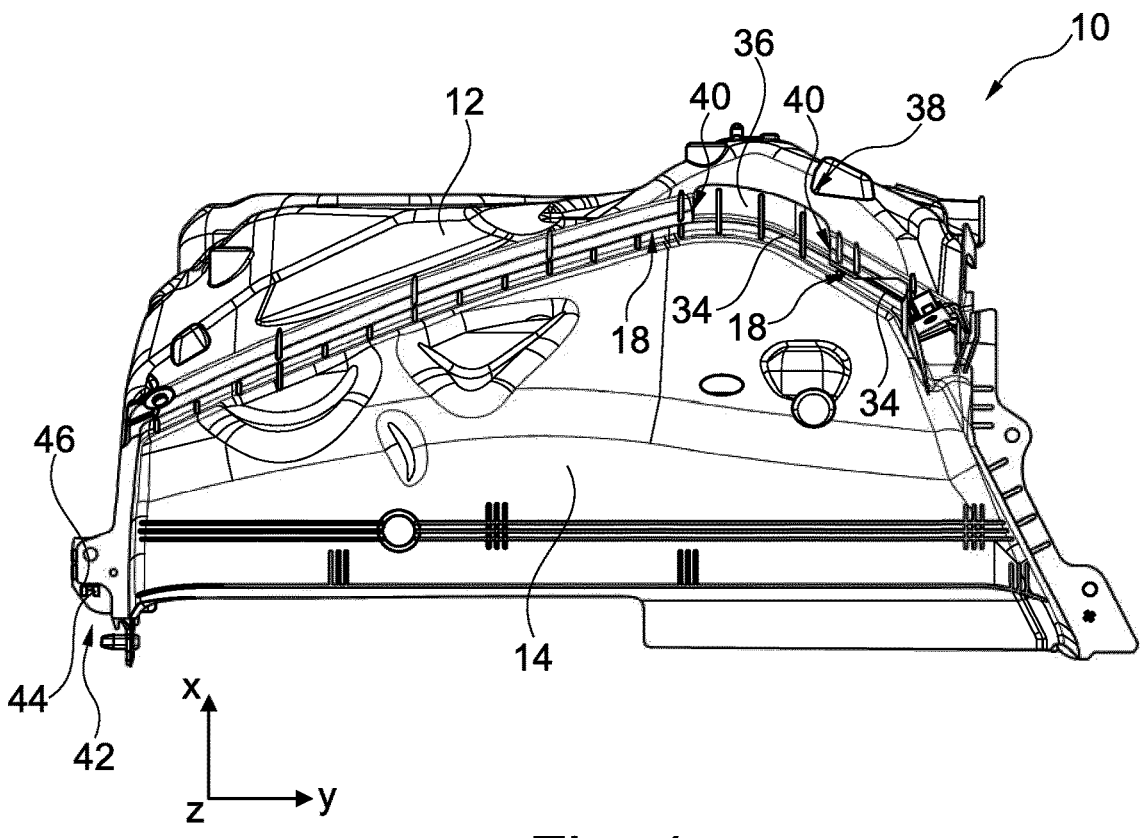
FIG. 1 is a plan view of an insulating wall for a motor vehicle, by which an engine compartment of the motor vehicle can be sound-proofed and/or thermally insulated with respect to a passenger compartment of the motor vehicle, wherein the insulating wall comprises a first insulating wall portion provided by a first component, and a second insulating wall portion provided by a second component connected to the first component.
Figures 2, 3:
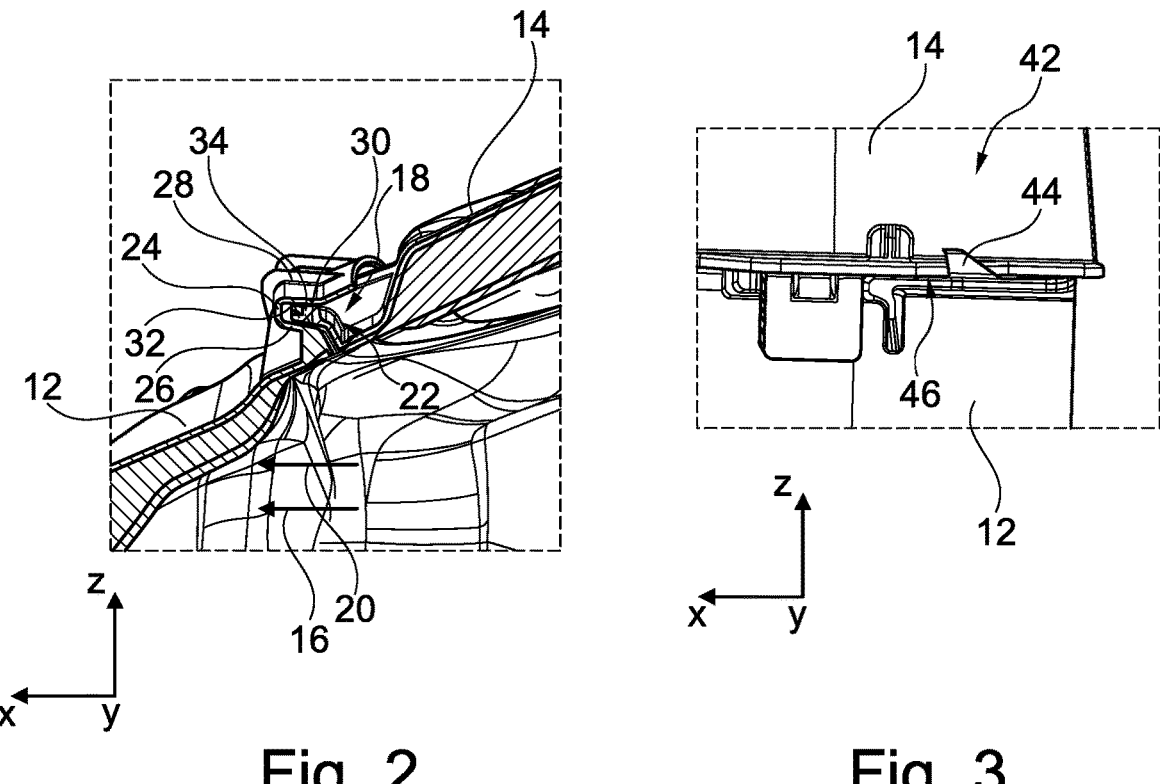
FIG. 2 is a schematic sectional view of a joining region, in which the second component is connected to the first component via a clamping connection, in that the second component is inserted into an insertion groove of the first component and is clamped therein.
FIG. 3 is a side view of a detail of a region of the insulating wall, in which the components are held against one another to form a fixing, wherein the first component has a latching lug which bears against a stop provided by the second component, as a result of which the components are fixed to one another in an insertion direction, in which the second component is inserted into the insertion groove of the first component.

FIG. 1 shows an insulating wall 10 for a motor vehicle. An engine compartment of the motor vehicle can be delimited in a soundproofing and/or heat-insulating manner in relation to a passenger compartment of the motor vehicle by means of the insulating wall 10. For this purpose, the insulating wall 10 comprises a thermally insulating and/or a sound-proofing material. In order to allow a person to have particularly good access to the engine compartment of the motor vehicle, the insulating wall 10 is formed in two parts in the present case. This means that the insulating wall 10 comprises a first component 12 having an insulating material, and a second component 14 having an insulating material. In this case, the first component 12 and the second component 14 may comprise the same insulating material or comprise insulating materials that are different from one another. In order to provide the insulating wall 10, the first component 12 and the second component 14 are to be connected to one another, wherein the second component 14 can be detached from the first component 12, in order to gain access to a region of the engine compartment of the motor vehicle separated by the insulating wall 10. In the present case, the first component 12 and the second component 14 are arranged one above the other in the installed position in the motor vehicle. In this case, the second component 14 is arranged above the first component 12 in the vertical vehicle direction z, so that to gain access from above to the region of the engine compartment separated by means of the insulating wall 10, the second component 14 can be detached from the first component 12.

In the connected state of the components 12, 14, the second component 14 is inserted in an insertion direction 16 into an insertion groove 18 of the first component 12. The second component 14 is clamped in this insertion groove 18 of the first component 12. A depth direction 20 of the insertion groove 18, which extends from an insertion opening 22 of the insertion groove 18, via which the second component 14 can be inserted into the insertion groove 18 in the insertion direction 16, to a base 24 of the insertion groove 18, coincides with the insertion direction 16 in the present case. In the present case, the insertion direction 16 extends in the longitudinal vehicle direction x.

The insertion groove 18 is delimited on the respective sides, in the present case on its upper side and on its lower side, by a first side wall member 26 and a second side wall member 28. The first side wall member 26 provides a first side wall 30 for the insertion groove 18, and the second side wall member 28 provides a second side wall 32 of the insertion groove 18. The first side wall 30 and the second side wall 32 delimit the insertion groove 18 on mutually opposite sides, in the present case upwards and downwards along the vehicle vertical direction z. In the present case, the insertion opening 22 is formed in a manner tapering in the depth direction 20. This means that a first distance between the first side wall 30 and the second side wall 32 is greater in a first region than a second distance between the first side wall 30 and the second side wall 32 in a second region of the insertion groove 18, which is arranged closer to the base 24 of the insertion groove 18 in comparison with the first region of the insertion groove 18. By means of the tapering of the insertion groove 18 in the depth direction 20, the second component 14 can be clamped in the insertion direction 16 from the side walls 30, 32 of the insertion groove 18 during insertion into the insertion groove 18. For this purpose, in its state inserted in the insertion groove 18, the second component 14 bears both on the first side wall 30 and on the second side wall 32. In order to ensure that the second component 14 bears securely against the side walls 30, 32 of the insertion groove 18, it is provided that the first side wall member 26 is formed with a first elasticity, and the second side wall member 28 is formed with a second elasticity which is greater than the first elasticity. By selecting the respective elasticities of the side wall members 26, 28 or setting a difference between the elasticities of the side wall members 26, 28, a holding force of the clamping connection of the second component 14 against the first component 12 can be set via the insertion groove 18.

In order to ensure that the second component 14 bears against the side walls 30, 32 of the insertion groove 18 particularly securely, when the second component 14 has a particularly small thickness, it is provided in the present case that the second component 14 has a rib 34. This rib 34 extends parallel to a front edge of the second component 14 in the insertion direction 16 and can be inserted into the insertion groove 18, in order to connect the components 12, 14 to the insulating wall 10. When the first component 12 is in a state connected to the second component 14, the rib 34 is therefore arranged at least in sections in the insertion groove 18 and it bears against at least one of the side walls 30, 32 of the insertion groove 18. The clamping connection between the first component 12 and the second component 14, which is provided by means of the insertion groove 18, allows the second component 14 to be fixed to the first component 12 in the present case in the vertical vehicle direction z.

In order to be able to fix the second component 14 relative to the first component 12 in the transverse vehicle direction y, the second component 14 has a projection 36. This projection 36 can be inserted into a recess 38 which interrupts the insertion groove 18 of the first component 12, in particular when the clamping connection between the components 12, 14 has been provided. In order to fix the second component 14 relative to the first component 12 in the transverse vehicle direction y, the projection 36 bears against the recess 38 in the transverse vehicle direction y on walls 40 of the first component 12 delimiting respective sides. In particular, the projection 36 is inserted into the recess 38 when the second component 14 is inserted in the insertion direction 16 into the insertion groove 18 of the first component 12. As a result of this, the second component 14 can be fixed via the connection to the first component 12, both in the vertical vehicle direction z and in the transverse vehicle direction y.

In order to enable the second component 14 to be fixed relative to the first component 12 in the longitudinal vehicle direction x and therefore in a third spatial direction, a fixing 42 arranged outside the insertion groove 18 is provided. In order to provide the fixing 42, the first component 12 has a latching lug 44. In the present case, this latching lug 44 projects in the vertical vehicle direction z from the first component 12 to the second component 14, and therefore upwardly. The second component 14 provides a stop 46 against which the latching lug 44 can be supported in the insertion direction 16. In the present case, this stop 46 is provided by a projection of the second component 14. Alternatively, the stop 46 can be provided by a wall of the second component 14 delimiting an opening. Placing the latching lug 44 against the stop 46 allows the second component 14 to be fixed relative to the first component 12 in the insertion direction 16. In the present case, the second component 14 is fixed in the insertion direction 16 on one side by the base 24 of the insertion groove 18 and is fixed on the opposite side by the latching lug 44. In other words, the second component 14 is limited in its freedom of movement in the longitudinal vehicle direction x to the front by the insertion groove 18 and is thereby fixed, and is limited in its movement in the longitudinal vehicle direction x to the rear by the latching lug 44 and thereby fixed.

When the first component 12 is in a state connected to the second component 14, they are fixed to one another in a first spatial direction relative to one another by means of the insertion groove 18, are fixed relative to one another via the projection 36 in a second spatial direction, and are fixed relative to one another via the latching lug 44 in a third spatial direction, wherein the spatial directions are oriented obliquely to one another, in particular perpendicularly to one another. The connection of the components 12, 14 which has been described allows a particularly simple provision of the insulating wall 10 by connecting the first component 12 to the second component 14, and particularly good accessibility due to the possibility of detaching the second component 14 from the first component 12 in a particularly simple manner.

Overall, the invention shows how a sealing concept for a second end wall can be implemented.

LIST OF REFERENCE SIGNS

10 insulating wall
12 first component
14 second component
16 insertion direction
18 insertion groove
20 depth direction
22 insertion opening
24 base
26 first side wall member
28 second side wall member
30 first side wall
32 second side wall
34 rib
36 projection
38 recess
40 wall
42 fixing
44 latching lug
46 stop
x vehicle longitudinal direction
y vehicle transverse direction
z vehicle vertical direction

The invention claimed is:

1. A wall for a motor vehicle, comprising: an insulating wall configured to separate an engine compartment of the motor vehicle from a passenger compartment of the motor vehicle in a soundproof and/or heat-insulated manner, wherein the insulating wall comprises a first component having an insertion groove and an insulating material, and a second component having an insulating material, the insertion groove is located along a majority of a transverse edge of the first component and the second component is inserted into the insertion groove of the first component in an insertion direction and clamped in the first component; wherein the first component has a recess which interrupts the insertion groove, with which a projection of the second component engages in the insertion direction.

2. The wall according to claim 1, wherein
the insertion groove has a cross section which tapers in the insertion direction, as a result of which the first component is fixed relative to the second component in a spatial direction oriented obliquely to the insertion direction.

3. The wall according to claim 1, wherein
the second component has a rib which extends parallel to a front edge of the second component in the insertion direction, the rib being clamped in the insertion groove.

4. The wall according to claim 1, wherein
a first side wall member of the first component delimiting the insertion groove on a first side is formed with a first elasticity, and
a second side wall member of the first component delimiting the insertion groove on a second side opposite the first side is formed with a second elasticity that is greater compared with the first elasticity.

5. The wall according to claim 1, wherein the first component and the second component are fixed to one another in the insertion direction via a fixing structure arranged outside the insertion groove.

6. The wall according to claim 5, wherein the fixing structure comprises a latching lug of the first component which bears against a stop of the second component.

7. The wall according to claim 1, wherein the first component is configured to be located on a substantially vertical wall of the motor vehicle that directly separates the engine compartment of the motor vehicle from the passenger compartment of the motor vehicle.

8. A motor vehicle, comprising: an engine compartment; a passenger compartment; and an insulating wall configured to separate the engine compartment from the passenger compartment in a soundproof and/or heat-insulated manner, wherein the insulating wall comprises a first component having an insertion groove and an insulating material, and a second component having an insulating material, the insertion groove is located along a majority of a transverse edge of the first component and the second component is inserted into the insertion groove of the first component in an insertion direction and clamped in the first component; wherein the first component has a recess which interrupts the insertion groove, with which a projection of the second component engages in the insertion direction.

9. The motor vehicle according to claim 8, wherein the second component is arranged above the first component in a vertical vehicle direction of the motor vehicle.

10. The motor vehicle according to claim 8, wherein the second component is inserted into the insertion groove of the first component at least substantially in a vehicle longitudinal direction as the insertion direction.

11. A motor vehicle, comprising: an engine compartment; a passenger compartment; a substantially vertical wall that directly separates the engine compartment from the passenger compartment; and an insulating wall configured to separate the engine compartment from the passenger compartment in a soundproof and/or heat-insulated manner, wherein the insulating wall comprises a first component having an insertion groove and an insulating material, a second component having an insulating material, the second component is inserted into the insertion groove of the first component in an insertion direction and clamped in the first component, the first component is located on the substantially vertical wall; wherein the first component has a recess which interrupts the insertion groove, with which a projection of the second component engages in the insertion direction.

\* \* \* \* \*